US007783413B2

(12) United States Patent
Cinpinski et al.

(10) Patent No.: US 7,783,413 B2
(45) Date of Patent: Aug. 24, 2010

(54) TWO-STEP OIL CONTROL VALVE FAILURE DIAGNOSTIC

(75) Inventors: Kenneth J. Cinpinski, Ray, MI (US); Donovan L. Dibble, Utica, MI (US)

(73) Assignee: GM Global Technology Operations, Inc.

( * ) Notice: Subject to any disclaimer, the term of this patent is extended or adjusted under 35 U.S.C. 154(b) by 0 days.

(21) Appl. No.: 12/041,159

(22) Filed: Mar. 3, 2008

(65) Prior Publication Data

US 2009/0222196 A1 Sep. 3, 2009

(51) Int. Cl.
*F01L 9/04* (2006.01)
*F01L 9/02* (2006.01)
*G05D 1/00* (2006.01)

(52) U.S. Cl. .................. 701/105; 123/90.11; 123/90.12

(58) Field of Classification Search ... 123/90.15–90.18, 123/345, 435, 332, 144, 198 R, 90.11, 90.12, 123/90.31, 346–348; 701/110, 101–105
See application file for complete search history.

(56) References Cited

U.S. PATENT DOCUMENTS 4,503,818 A * 3/1985 Hara et al. ............... 123/90.16
6,318,313 B1 * 11/2001 Moriya et al. ............ 123/90.15
6,722,331 B2 * 4/2004 Koehler et al. ........... 123/90.45
7,063,057 B1 * 6/2006 Waters et al. ............ 123/90.16

* cited by examiner

*Primary Examiner*—Stephen K Cronin
*Assistant Examiner*—Keith Coleman

(57) ABSTRACT

A method may include commanding operation of an engine in a first lift mode. The engine may include a valve lifter system that selectively operates a valve member in the first lift mode and a second lift mode through engagement with a camshaft. A first duty cycle of a cam phaser oil control valve (OCV) may be determined to maintain a first camshaft position corresponding to the first lift mode. The camshaft position may be maintained by a cam phaser that is coupled to the camshaft and in communication with the cam phaser OCV. Engine operation may be commanded to the second lift mode and a second duty cycle of the cam phaser OCV may be determined to maintain a second camshaft position corresponding to the second lift mode. A valve lifter system failure may be diagnosed based on a difference between the first and second duty cycles.

20 Claims, 4 Drawing Sheets

TWO-STEP OIL CONTROL VALVE FAILURE DIAGNOSTIC

FIELD

The present disclosure relates to engine valvetrain diagnostics, and more specifically to a valve lifter system diagnostic.

BACKGROUND

The statements in this section merely provide background information related to the present disclosure and may not constitute prior art.

Engine assemblies typically include intake and exhaust valves that are actuated by valve lifters. The valve lifters may be operable in first and second modes to provide first and second lift durations for the intake and exhaust valves in order to improve engine performance, such as increasing fuel economy and power output. Operating parameters of the engine may be adjusted based on whether the engine is operating in the first or second lift mode. Engine performance may be reduced if the engine is commanded from the first to the second lift mode but remains in the first lift mode.

SUMMARY

A method may include commanding operation of an engine in a first lift mode. The engine may include a valve lifter system that selectively operates a valve member including one of an intake valve and an exhaust valve in the first lift mode and a second lift mode through engagement with a camshaft. The method may further include determining a first duty cycle of a cam phaser oil control valve (OCV) to maintain a first camshaft position corresponding to the first lift mode. The camshaft position may be maintained by a cam phaser that is coupled to the camshaft and in communication with the cam phaser OCV. The method may further include commanding operation of the engine in the second lift mode, determining a second duty cycle of the cam phaser OCV to maintain a second camshaft position corresponding to the second lift mode, and diagnosing a valve lifter system failure based on a difference between the first and second duty cycles.

A control module may include a lifter control module, a cam phaser oil control valve (OCV) control module, and a lifter failure determination module. The lifter control module may command operation of an engine in first and second lift modes. The engine may include a valve lifter system that selectively operates a valve member including one of an intake valve and an exhaust valve in the first and second lift modes through engagement with a camshaft. The cam phaser OCV control module may determine a first duty cycle of a cam phaser OCV to maintain a first camshaft position corresponding to the first lift mode and a second duty cycle of the cam phaser OCV to maintain a second camshaft position corresponding to the second lift mode. The first and second camshaft positions may be maintained by a cam phaser that is coupled to the camshaft and in communication with the cam phaser OCV. The lifter failure determination module may be in communication with the lifter control module and the cam phaser OCV control module and may diagnose a valve lifter system failure based on a difference between said first and second duty cycles.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
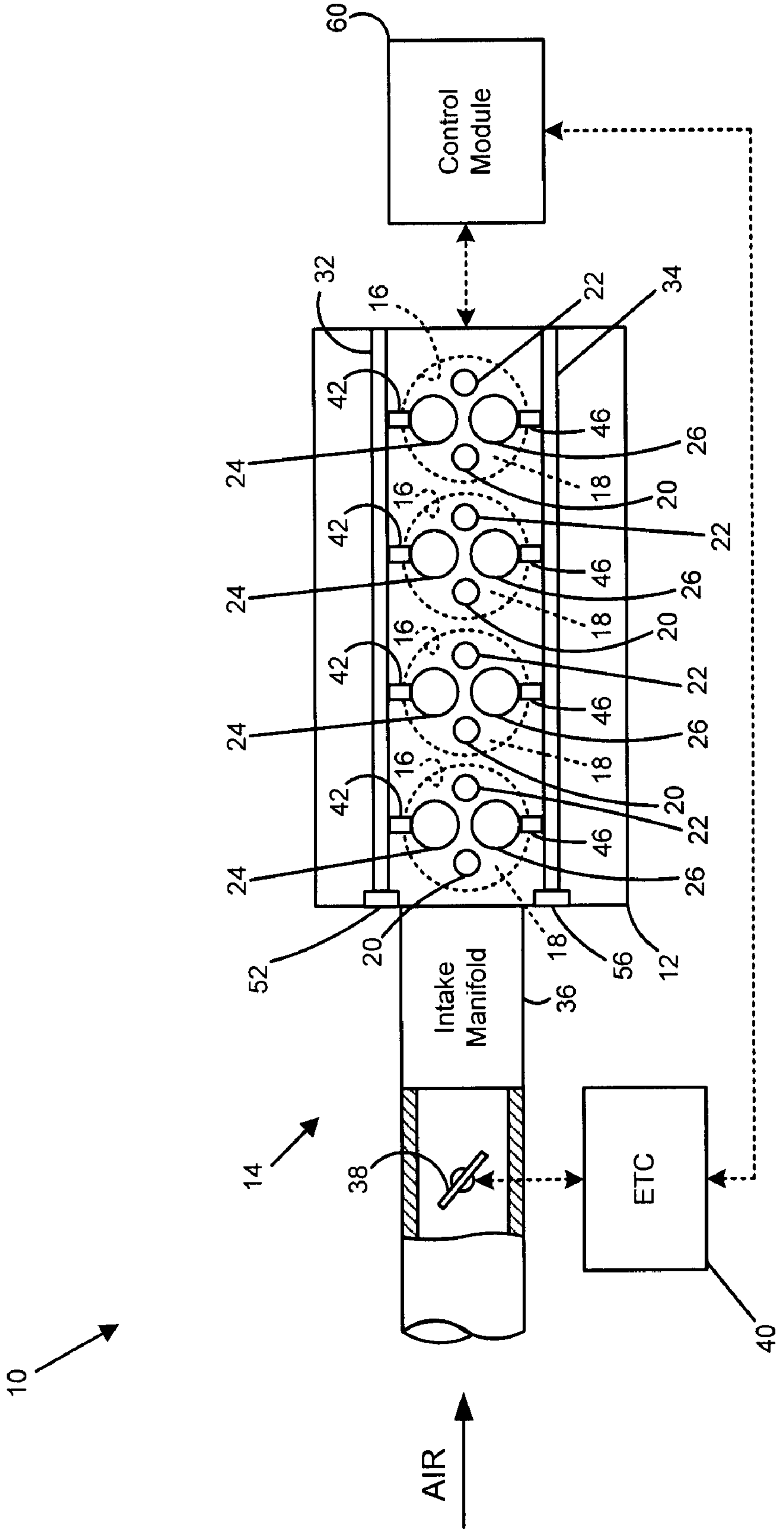
FIG. 1 is a schematic illustration of a vehicle according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Figure 2:
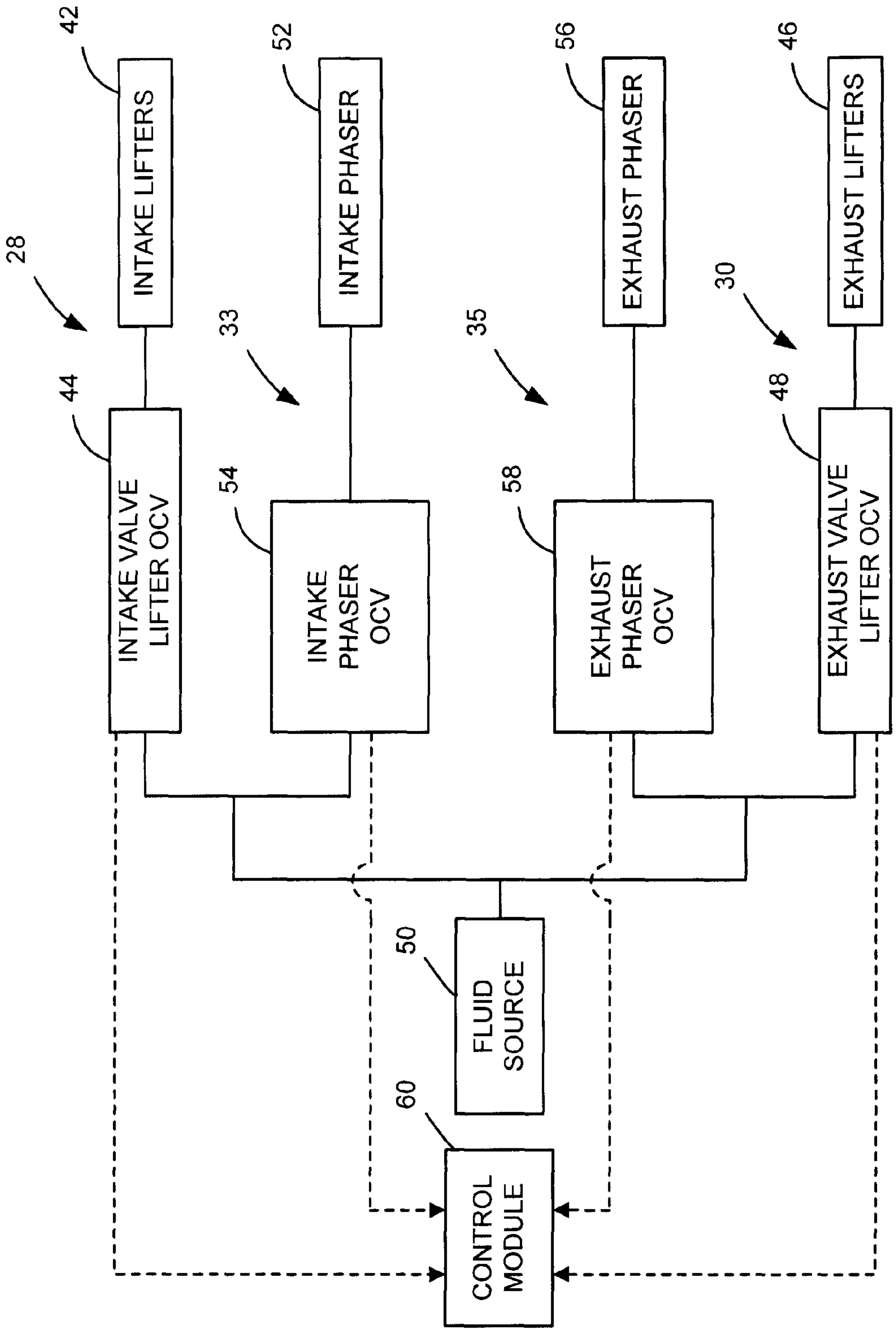
FIG. 2 is a schematic illustration of a portion of an engine of the vehicle shown in FIG. 1.

Referring now to FIGS. 1 and 2, an exemplary vehicle 10 is schematically illustrated. Vehicle 10 may include an engine 12 in communication with an intake system 14. Engine 12 may include a plurality of cylinders 16 having pistons 18 disposed therein. Engine 12 may further include a fuel injector 20, a spark plug 22, an intake valve 24, and an exhaust valve 26 for each cylinder 16, as well as an intake valve lifter system 28, an exhaust valve lifter system 30, intake and exhaust camshafts 32, 34, and intake and exhaust cam phaser systems 33, 35.

Intake system 14 may include an intake manifold 36 and a throttle 38 in communication with an electronic throttle control (ETC) 40. Throttle 38 and intake valves 24 may control an air flow into engine 12. Fuel injector 20 may control a fuel flow into engine 12 and spark plug 22 may ignite the air/fuel mixture provided to engine 12 by intake system 14 and fuel injector 20.

Intake valve lifter system 28 may include intake valve lifters 42 and an intake valve lifter oil control valve (OCV) 44. Exhaust valve lifter system 30 may include exhaust valve lifters 46 and an exhaust valve lifter OCV 48. Intake and exhaust valve lifters 42, 46 may include two-step valve lifters that are selectively operable in first and second modes. The first mode may provide a first lift duration and the second mode may provide a second lift duration. More specifically, the first mode may correspond to a low lift mode and the second mode may correspond to a high lift mode. The high lift mode may include a greater displacement of intake and exhaust valves 24, 26 relative to the low lift mode, resulting in a greater open duration for intake and exhaust valves 24, 26.

Intake and exhaust valve lifters 42, 46 may include hydraulically actuated devices (not shown) that switch intake and exhaust lifters 42, 46 between the first and second modes based on a fluid pressure. As seen in FIG. 2, intake and exhaust lifter systems 28, 30 may be in communication with a pressurized fluid source 50. Fluid source 50 may include oil supplied by an engine oil pump. Intake valve lifter OCV 44 may control a fluid flow supplied to intake valve lifters 42, and therefore a fluid pressure applied to the hydraulically actuated switching mechanism of intake valve lifters 42. Exhaust valve lifter OCV 48 may control a fluid flow supplied to exhaust valve lifters 46, and therefore a fluid pressure applied to the hydraulically actuated switching mechanism of exhaust valve lifters 46.

Intake cam phaser system 33 may include an intake cam phaser 52 and an intake cam phaser OCV 54. Exhaust cam phaser system 35 may include an exhaust cam phaser 56 and an exhaust cam phaser OCV 58. Intake and exhaust cam phasers 52, 56 may include vane-type hydraulically actuated cam phasers which may selectively advance or retard a position of intake and exhaust camshafts 32, 34 by supplying a pressurized fluid to intake and exhaust cam phasers 52, 56. As seen in FIG. 2, intake and exhaust cam phaser systems 33, 35 may be in communication with pressurized fluid source 50. Intake cam phaser OCV 54 may control a fluid flow supplied to intake cam phaser 52, and therefore actuation of intake cam phaser 52. Exhaust cam phaser OCV 58 may control a fluid flow supplied to exhaust cam phaser 56, and therefore actuation of exhaust cam phaser 56.

Intake and exhaust camshafts 32, 34 may be engaged with intake and exhaust valve lifters 26, 30 to actuate opening and closing of intake and exhaust valves 24, 26. Intake camshaft 32 may be coupled to intake cam phaser 52 and exhaust camshaft 34 may be coupled to exhaust cam phaser 56. Therefore, advancing and retarding of intake camshaft 32 may be controlled by intake cam phaser OCV 54 and advancing and retarding of exhaust camshaft 34 may be controlled by exhaust cam phaser OCV 58.

Figure 3:
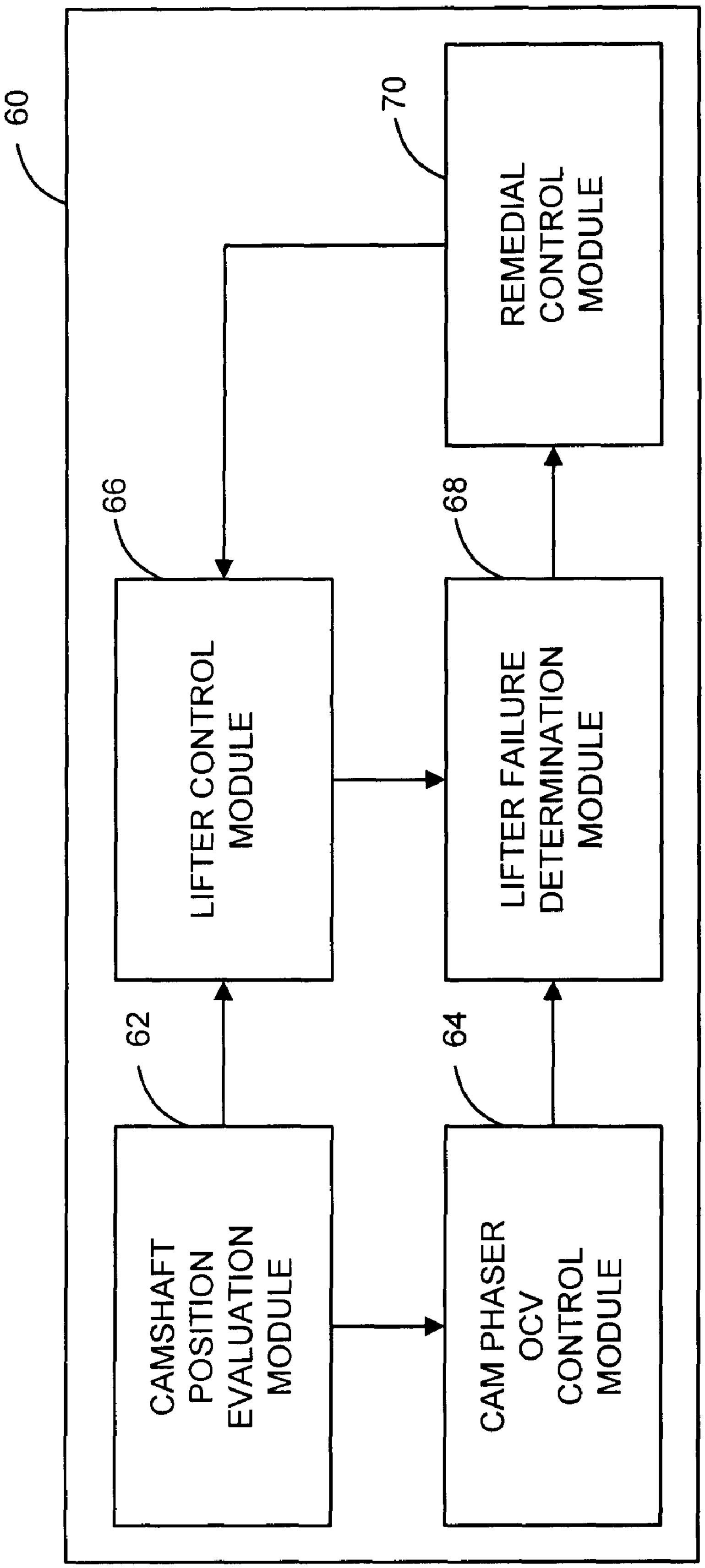
FIG. 3 is a is a control block diagram of the control module shown in FIGS. 1 and 2.

With reference to FIG. 3, vehicle 10 may additionally include a control module 60. Control module 60 may be in communication with ETC 40 to control an air flow provided to engine 12. Control module 60 may additionally be in communication with engine 12 to control operation of intake valve lifter system 28, exhaust valve lifter system 30, intake cam phaser system 33, and exhaust cam phaser system 35. More specifically, as seen in FIG. 2, control module 60 may be in communication with intake valve lifter OCV 44, exhaust valve lifter OCV 48, intake cam phaser OCV 54, and exhaust cam phaser OCV 58.

Control module 60 may include a camshaft position evaluation module 62, a cam phaser OCV control module 64, a lifter control module 66, a lifter failure determination module 68, and a remedial control module 70. Cam phaser position evaluation module 62 may determine an operating condition of intake and exhaust cam phasers 52, 56 and a corresponding position of intake and exhaust camshafts 32, 34. For example, cam phaser position evaluation module 62 may determine whether intake cam phaser 52 is in a fully advanced or a fully retarded position (parked position) or a position between fully advanced and fully retarded (intermediate position) and whether exhaust cam phaser 56 is in a fully advanced (parked position) or a fully retarded position or a position between fully advanced and fully retarded (intermediate position). Cam phaser position evaluation module 62 may additionally determine a cam phaser position error based on a camshaft position determination and evaluate the error relative to a predetermined error limit.

Cam phaser OCV control module 64 may be in communication with lifter failure determination module 68 and may adjust intake and exhaust cam phaser OCVs 54, 58 to adjust the position of intake and exhaust cam phasers 52, 56. Cam phaser OCV control module 64 may provide a pulse width modulated (PWM) signal to open and close intake and exhaust cam phaser OCVs 54, 58 to maintain a predetermined phaser position. The duty cycle may generally be defined as the percent of time that the OCV is commanded to the open position during each period of the PWM signal. The duty cycle provided during a high lift mode may be greater than the duty cycle provided during a low lift mode to maintain approximately the same cam phaser position. The high lift mode may apply a greater torque to the cam phaser than the low lift mode, resulting in a higher rate of oil leakage during the high lift mode than during the low lift mode. The increased duty cycle during the high lift mode may account for the additional oil leakage.

Lifter control module 66 may be in communication with lifter failure determination module 68 and may adjust intake and exhaust valve lifter OCVs 44, 48 to selectively actuate intake and exhaust lifters 42, 46. Lifter failure determination module 68 may be in communication with remedial control module 70 and may determine whether a mechanism has failed in intake or exhaust valve lifter systems 28, 30, such as a failed lifter OCV. Remedial control module 70 may be in communication with lifter control module 66 and may provide remedial actions when a lifter failure is diagnosed by lifter failure determination module 68.

Figure 4:
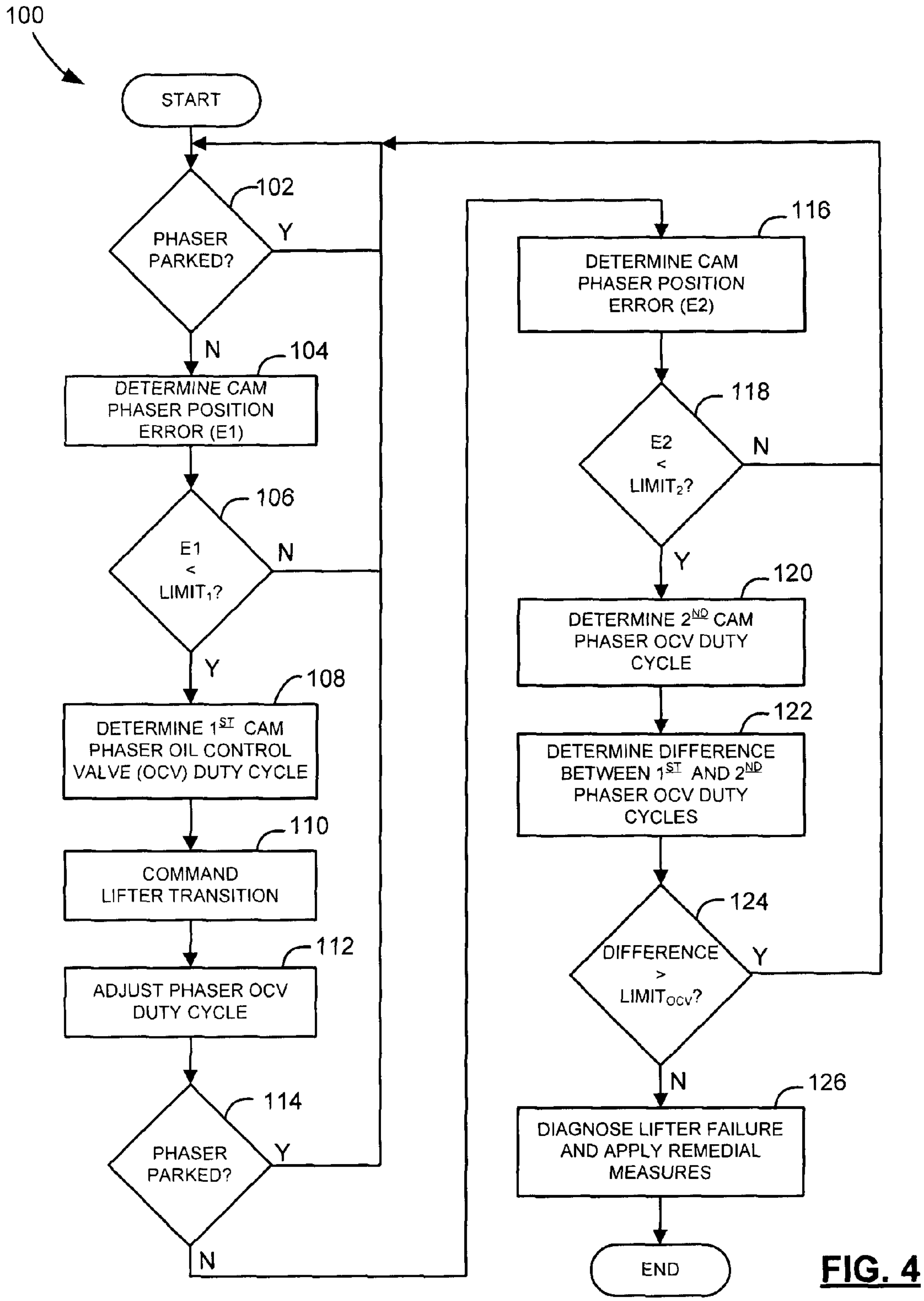
FIG. 4 is a flow diagram illustrating steps for control of the vehicle of FIG. 1.

With reference to FIG. 4, control logic 100 for the determination of a valve lifter system failure is illustrated. At the start of control logic 100, engine 12 may be operating in one of the first and second lifter modes. Control logic 100 may begin at block 102 where a cam phaser position is evaluated. Control logic 100 applies to intake cam phaser system 33 and intake valve lifter system 28, as well as exhaust cam phaser system 35 and exhaust valve lifter system 30. For simplicity, control logic 100 will be described with respect to intake cam phaser system 33 and intake valve lifter system 28 with the understanding that the description applies equally to exhaust cam phaser system 35 and exhaust valve lifter system 30.

Block 102 may determine whether intake cam phaser 52 is in a parked position using camshaft position evaluation module 62. If intake cam phaser 52 is in the parked position, control logic 100 may return to block 102. If intake cam phaser 52 is not in a parked position, control logic 100 may proceed to block 104, where a first cam phaser position error (E1) is determined using camshaft position evaluation module 62. Cam phaser position error (E1) may be determined by comparing an advanced or retarded position of intake camshaft 32 relative to a desired advanced or retarded position.

Control logic 100 may then proceed to block 106 where cam phaser position error (E1) is compared to a predetermined limit ($LIMIT_1$). If cam phaser position error (E1) is less than the predetermined limit ($LIMIT_1$), control logic 100 may proceed to block 108. Otherwise, control logic 100 may return to block 102. A cam phaser position error (E1) that is less than the predetermined limit ($LIMIT_1$) may generally indicate a steady state position of intake camshaft 32.

Block 108 may use cam phaser OCV control module 64 to determine a first duty cycle of intake cam phaser OCV 54 corresponding to the steady state position of intake cam phaser 52 associated with error (E1). Control logic 100 may then proceed to block 110 where lifter control module 66 may command operation of engine 12 in the other of the first and second lifter modes. For example, if intake valve lifter system 28 was operating in the low lift mode at the start of control logic 100, block 110 may command operation of intake valve lifter system 28 in the high lift mode. Control logic 100 may then proceed to block 112.

Block 112 may adjust the duty cycle of intake cam phaser OCV 54 based on the change in lift mode. As indicated above, the duty cycle of intake cam phaser OCV 54 may vary between the low and high lift modes in order to maintain a desired position of intake camshaft 32. For example, the duty cycle may be increased when the lift mode transitions from a low lift mode to a high lift mode and may be decreased when the lift mode transitions from a high lift mode to a low lift mode. Control logic 100 may then proceed to block 114.

Block 114 may once again determine whether intake cam phaser 52 is in a parked position using camshaft position evaluation module 62. If intake cam phaser 52 is in the parked position, control logic 100 may return to block 102. If intake cam phaser 52 is not in a parked position, control logic 100 may proceed to block 116, where a second cam phaser position error (E2) is determined using camshaft position evaluation module 62. Control logic 100 may then proceed to block 118 where cam phaser position error (E2) is compared to a predetermined limit ($LIMIT_2$).

If cam phaser position error (E2) is less than the predetermined limit ($LIMIT_2$), control logic 100 may proceed to block 120. Otherwise, control logic 100 may return to block 102. A cam phaser position error (E2) that is less than the predetermined limit ($LIMIT_2$) may generally indicate a steady state position of intake camshaft 32.

Block 120 may use cam phaser OCV control module 64 to determine a second duty cycle of intake cam phaser OCV 54 corresponding to the steady state position of intake cam phaser 52 associated with error (E2). Control logic 100 may then proceed to block 122 where a difference between the first and second duty cycles is determined by lifter failure determination module 68. Control logic 100 may then proceed to block 124.

Block 124 may determine whether the difference is greater than a predetermined limit ($LIMIT_{OCV}$). If the difference is greater than the predetermined limit ($LIMIT_{OCV}$), control logic 100 may return to block 102. Otherwise, control logic 100 may proceed to block 126. The predetermined limit ($LIMIT_{OCV}$) may generally correspond to an expected difference in intake cam phaser duty cycle between operation in the low and high lift modes. A difference that is less than the predetermined limit ($LIMIT_{OCV}$) may generally indicate a failed intake valve lifter OCV 44, resulting in intake valve lifters 42 not transitioning between lifter modes when commanded at block 110. As such, the first and second duty cycles may be generally equal to one another when intake valve lifter OCV 44 experiences a failure.

Control logic 100 may proceed to block 126 where an intake lifter failure is diagnosed and remedial measures are applied. Remedial control module 70 may apply remedial measures including controlling operating parameters of engine 12 to correspond to the lifter mode that engine 12 is actually operating in, rather than the commanded mode. Control logic 100 may then terminate.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method comprising:

commanding operation of an engine valve lifter system in a first lift mode;

determining a first duty cycle of a cam phaser oil control valve (OCV) to maintain a first camshaft position corresponding to said first lift mode, commanding operation of said valve lifter system in a second lift mode;

determining a second duty cycle of said cam phaser OCV to maintain a second camshaft position corresponding to said second lift mode; and diagnosing a valve lifter system failure based on a difference between said first and second duty cycles.

2. The method of claim 1, wherein said first lift mode is one of a high lift mode and a low lift mode and said second lift mode is the other of said high and low lift modes, said high lift mode providing a greater opening duration of a valve member than said low lift mode.

3. The method of claim 1, wherein said valve lifter system failure is diagnosed when said difference is less than a predetermined limit.

4. The method of claim 3, wherein said first and second duty cycles are approximately equal.

5. The method of claim 1, wherein said lifter system failure includes said valve lifter system remaining in said first lift mode after said commanding operation of said valve lifter system in said second lift mode.

6. The method of claim 5, wherein said valve lifter system includes a lifter OCV and a hydraulically actuated valve lifter that actuates a valve member in one of said first and second lift modes based on an oil supply pressure from said lifter OCV.

7. The method of claim 6, wherein said failure includes a lifter OCV failure.

8. The method of claim 1, wherein said first and second duty cycles are determined when a cam phaser associated with said cam phaser OCV is in a steady-state condition.

9. The method of claim 8, further comprising determining a first camshaft position error before said determining said first duty cycle and determining a second camshaft position error before said determining said second duty cycle.

10. The method of claim 9, wherein said determining said first and second camshaft position errors occur when said cam phaser is between a fully advanced and a fully retarded position.

11. The method of claim 1, wherein said first and second camshaft positions are commanded camshaft positions and are approximately the same.

12. The method of claim 11, wherein said first lift mode is one of a high lift mode and a low lift mode and said second lift mode is the other of said high and low lift modes, said high lift mode providing a greater opening duration of a valve member than said low lift mode and a phaser OCV duty cycle associated with said high lift mode being greater than a phaser OCV duty cycle associated with said low lift mode.

13. A control module comprising:

a lifter control module that commands operation of an engine in first and second lift modes, said engine including a valve lifter system that selectively operates a valve member including one of an intake valve and an exhaust valve in said first and second lift modes through engagement with a camshaft;

a cam phaser oil control valve (OCV) control module that determines a first duty cycle of a cam phaser OCV to maintain a first camshaft position corresponding to said first lift mode and a second duty cycle of said cam phaser OCV to maintain a second camshaft position corresponding to said second lift mode, said first and second camshaft positions being maintained by a cam phaser that is coupled to said camshaft and in communication with said cam phaser OCV; and a lifter failure determination module in communication with said lifter control module and said cam phaser OCV control module that diagnoses a valve lifter system failure based on a difference between said first and second duty cycles.

14. The control module of claim 13, wherein said lifter failure determination module diagnoses a valve lifter system failure when said difference is less than a predetermined limit.

15. The control module of claim 14, wherein said first and second duty cycles are approximately equal when said lifter failure determination module diagnoses a valve lifter system failure.

16. The control module of claim 13, wherein said valve lifter system failure includes said valve lifter system remaining in said first lift mode after said lifter control module commands a transition from said first lift mode to said second lift mode.

17. The control module of claim 16, wherein said valve lifter system includes a lifter OCV and a hydraulically actuated valve lifter that actuates said valve member in one of said first and second lift modes based on an oil supply pressure from said lifter OCV, said valve lifter system failure including a lifter OCV failure.

18. The control module of claim 13, further comprising a camshaft position evaluation module in communication with said cam phaser OCV control module that determines when said cam phaser is in a steady-state condition.

19. The control module of claim 13, further comprising a camshaft position evaluation module in communication with said cam phaser OCV control module that commands said camshaft to said first and second camshaft positions, wherein said first and second camshaft positions are generally the same.

20. The control module of claim 19, wherein said first lift mode is one of a high lift mode and a low lift mode and said second lift mode is the other of said high and low lift modes, said high lift mode providing a greater opening duration of said valve member than said low lift mode, a phaser OCV duty cycle associated with said high lift mode being greater than a phaser OCV duty cycle associated with said low lift mode.

* * * * *